United States Patent
Huang et al.

(10) Patent No.: US 9,204,249 B2
(45) Date of Patent: Dec. 1, 2015

(54) USING A LOCATION TO REFINE NETWORK-PROVIDED TIME ZONE INFORMATION

(71) Applicant: Apple Inc., Cupertino, CA (US)

(72) Inventors: Ronald Keryuan Huang, San Jose, CA (US); Jay N. Bruins, Los Altos, CA (US); Marc Edward Schonbrun, San Jose, CA (US); Vinay A. Ramaswamy, San Jose, CA (US); Longda Xing, San Jose, CA (US); Madhusudan Chaudhary, Sunnyvale, CA (US); Matthew S. Klahn, San Jose, CA (US)

(73) Assignee: Apple Inc., Cupertino, CA (US)

( * ) Notice: Subject to any disclaimer, the term of this patent is extended or adjusted under 35 U.S.C. 154(b) by 151 days.

(21) Appl. No.: 14/020,555

(22) Filed: Sep. 6, 2013

(65) Prior Publication Data

US 2014/0066064 A1    Mar. 6, 2014

Related U.S. Application Data (60) Provisional application No. 61/697,790, filed on Sep. 6, 2012, provisional application No. 61/697,792, filed on Sep. 6, 2012, provisional application No. 61/697,793, filed on Sep. 6, 2012, provisional application No. 61/705,749, filed on Sep. 26, 2012, provisional application No. 61/705,751, filed on Sep. 26, 2012, provisional application No. 61/705,754, filed on Sep. 26, 2012.

(51) Int. Cl.
*H04W 4/02* (2009.01)
*G04G 9/00* (2006.01)

(52) U.S. Cl.
CPC ............... *H04W 4/02* (2013.01); *H04W 4/021* (2013.01); *G04G 9/0076* (2013.01)

(58) Field of Classification Search
None
See application file for complete search history.

(56) References Cited

U.S. PATENT DOCUMENTS

| | | | |
|---|---|---|---|
| 6,198,696 B1 | 3/2001 | Korpi et al. |
| 6,728,533 B2 | 4/2004 | Ishii |
| 6,771,990 B1 | 8/2004 | Nilsson |
| 6,963,588 B1 | 11/2005 | Lynch et al. |
| 7,664,527 B2 | 2/2010 | Bari et al. |
| 7,948,832 B1 | 5/2011 | Luo et al. |
| 8,290,489 B2 | 10/2012 | Ali et al. |
| 2003/0040321 A1 | 2/2003 | Chen et al. |
| 2006/0002236 A1 | 1/2006 | Punkka |
| 2008/0051108 A1 | 2/2008 | Stewart |
| 2011/0112765 A1 | 5/2011 | Lai |

(Continued)

OTHER PUBLICATIONS

3GPP TS 22.042 V10.0.0, by 3GPP, dated Mar. 2011.*

(Continued)

*Primary Examiner* — Daniel Lai
(74) *Attorney, Agent, or Firm* — Downey Brand LLP (57) ABSTRACT

A method for using a location to refine network-provided time zone information is disclosed. The method can include a wireless communication device receiving a time zone information message from a network; determining multiple candidate time zones matching a set of time zone identification parameters included in the received time zone information message; deriving a location of the wireless communication device; and using the location to select a current time zone for the wireless communication device from the candidate time zones matching the set of time zone identification parameters.

20 Claims, 8 Drawing Sheets

(56) References Cited

U.S. PATENT DOCUMENTS

| | | |
|---|---|---|
| 2011/0130139 A1 | 6/2011 | Ali et al. |
| 2011/0163873 A1* | 7/2011 | McIntosh ................. 340/539.13 |
| 2011/0218988 A1* | 9/2011 | Rhoten ......................... 707/723 |
| 2011/0237237 A1 | 9/2011 | Kashikar |
| 2013/0034221 A1 | 2/2013 | Aaron et al. |
| 2014/0066064 A1 | 3/2014 | Huang et al. |

OTHER PUBLICATIONS

E. Lear et al., "Timezone Options for DHCP", Cisco Systems GmbH, http://tools.ietf.org/html/rfc4833, Apr. 2007, pp. 1-10.

* cited by examiner

USING A LOCATION TO REFINE NETWORK-PROVIDED TIME ZONE INFORMATION

CROSS-REFERENCE TO RELATED APPLICATIONS

This application claims the benefit of (i) U.S. Provisional Patent Application No. 61/697,790, filed on Sep. 6, 2012, (ii) U.S. Provisional Patent Application No. 61/697,792, filed on Sep. 6, 2012, (iii) U.S. Provisional Patent Application No. 61/697,793, filed on Sep. 6, 2012, (iv) U.S. Provisional Patent Application No. 61/705,749, filed on Sep. 26, 2012, (v) U.S. Provisional Patent Application No. 61/705,751, filed on Sep. 26, 2012, and (vi) U.S. Provisional Patent Application No. 61/705,754, filed on Sep. 26, 2012, each of which is incorporated herein in its entirety by reference.

FIELD OF THE DESCRIBED EMBODIMENTS

The described embodiments generally relate to time zone determination by a wireless communication device, and more particularly to using a location to refine network-provided time zone information.

BACKGROUND

Many wireless communication devices maintain a local time that may be used to provide time information to time-dependent applications, such as calendar applications, alarm applications, and the like. Due to their mobility, wireless communication devices are often transported between time zones. When a wireless communication device is transported to another time zone, the device's local time needs to be synchronized to the current time zone so that a valid local time can be provided to time-dependent applications.

Some wireless carriers transmit Network Identity and Time Zone (NITZ) messages including embedded information which wireless communication devices can use to derive a current time zone. However, the timing of sending a NITZ message is often at the discretion of the serving network. Accordingly, a wireless communication device may not be sent an updated NITZ message upon transitioning from one time zone to another. As such, a device that has transitioned between time zones may provide an incorrect local time to time-dependent applications, which may not function as expected by the user due to the incorrect local time.

Even when a recent NITZ message is available to a wireless communication device, there can be some ambiguity as to a time zone derived from a NITZ message. In this regard, due to varying implementation of Daylight Savings Time (DST) rules, multiple time zones can match parameters included in a NITZ message at certain times of the year. For example, the State of Arizona in the United States does not implement DST. At certain times of the year, there can be ambiguity as to whether time zone parameters in a NITZ message indicate that a user is located in the America/Phoenix time zone or in the America/Denver time zone. While selecting either time zone can provide an accurate local time for a user at least temporarily, errors can result around the time of DST transitions. In this regard, if America/Denver is selected as the time zone for a user located in Arizona, the user's local time can be incorrect when the America/Denver time zone transitions from Mountain Standard Time (MST) to Mountain Daylight Time (MDT).

BRIEF SUMMARY OF SOME DISCLOSED EMBODIMENTS

Some example embodiments disclosed herein provide a wireless communication device configured to use a location derived for the device to refine network-provided time zone information. In this regard, some example embodiments provide a solution that can improve the accuracy of time zone determination in situations in which there can be ambiguity as to a time zone derived from network-provided time zone information, such as situations in which it is unclear from network-provided time zone information whether a user is located in the America/Phoenix time zone or in the America/Denver time zone. More particularly, in situations in which multiple time zones match a set of time zone identification parameters included in a time zone information message sent by a serving network, some example embodiments use a location of a wireless communication device to select a current time zone from the multiple matching time zones. Accordingly, example embodiments disclosed herein can improve the accuracy of the local time provided to time-dependent applications through more accurate time zone determination, thus improving the user experience.

This Summary is provided merely for purposes of summarizing some example embodiments so as to provide a basic understanding of some aspects of the disclosure. Accordingly, it will be appreciated that the above described example embodiments are merely examples and should not be construed to narrow the scope or spirit of the disclosure in any way. Other embodiments, aspects, and advantages will become apparent from the following detailed description taken in conjunction with the accompanying drawings which illustrate, by way of example, the principles of the described embodiments.

BRIEF DESCRIPTION OF THE DRAWINGS

The described embodiments and the advantages thereof may best be understood by reference to the following description taken in conjunction with the accompanying drawings. These drawings in no way limit any changes in form and detail that may be made to the described embodiments by one skilled in the art without departing from the spirit and scope of the described embodiments.

DETAILED DESCRIPTION OF SELECTED EMBODIMENTS

Some example embodiments disclosed herein provide a wireless communication device configured to use a location derived for the device to refine network-provided time zone information. In this regard, such example embodiments use a location to select a time zone in a situation in which multiple candidate time zones match a set of time zone identification parameters included in a time zone information message sent by a serving network. Accordingly, situations such as when it is unclear as to whether a device is located in the America/Phoenix time zone or in the America/Denver time zone can be addressed by using a derived location for the device to make an appropriate time zone selection.

Some example embodiments further provide a wireless communication device configured to solicit a time zone information message from a network. In this regard, some example embodiments provide a wireless communication device that can provoke a network to send a time zone information message by refreshing a connection to the network. As such, wireless communication devices in accordance with such example embodiments can receive a time zone information message in on demand when the device determines to perform a time zone update procedure and can use the received time zone information message to facilitate determination of an updated current time zone and can set a corresponding local time.

Some example embodiments additionally provide improvements in the accuracy of time zone determination based on location. In this regard, while location-based time zones can be derived by some wireless communication devices without depending on a network to send a time zone information message, there can be some ambiguity in a location-based time zone. For example, in cases in which a device is located in a border region, a location-derived time zone can be inaccurate and/or can be a time zone other than one preferred for the user. Some example embodiments address this ambiguity by providing a wireless communication device configured to bias location-based time zone selection. In this regard, a wireless communication device in accordance with such example embodiments can be configured to determine whether a derived location-based time zone is a valid time zone for a country in which the device's serving base station is located. If the location-based time zone is a valid time zone for the country in which the serving base station is located, the location-based time zone can be further considered as a possible current time zone for the device. If, however, the location-based time zone is not a valid time zone for the country in which the serving base station is located, the location-based time zone can be discarded as invalid in accordance with such example embodiments. Accordingly, such example embodiments address situations, such as border crossings, in which location ambiguity can result in selection of an incorrect or otherwise undesired time zone. Some example embodiments that use location-biased time zone determination can be used in combination with embodiments that use a location to refine network-provided time zone information in order to further improve the accuracy of time zone determination.

Figure 1:
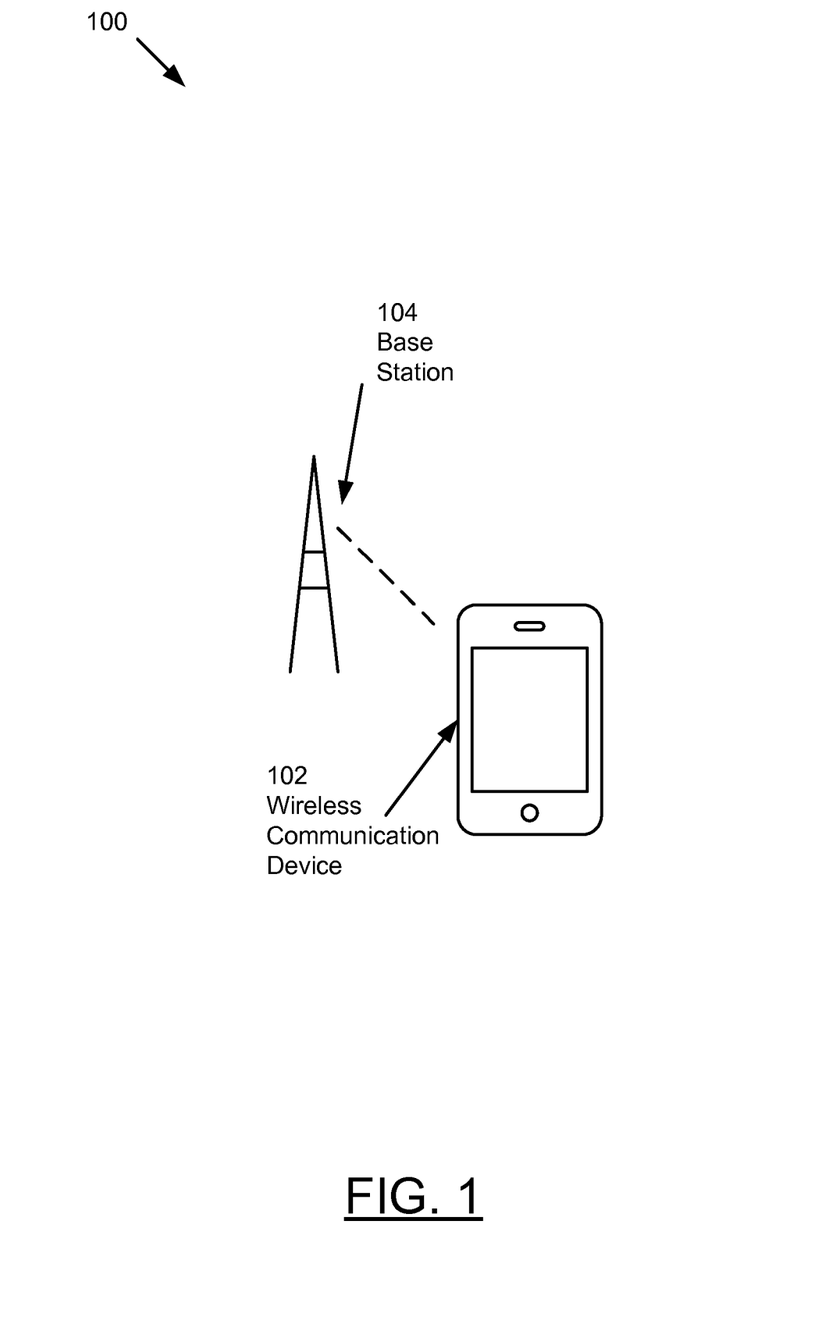
FIG. 1 illustrates a wireless communication system including a wireless communication device and serving base station in accordance with some example embodiments.

FIG. 1 illustrates a wireless communication system 100 including a wireless communication device 102 and serving base station 104 in accordance with some example embodiments. The wireless communication device 102 can be any computing device configured to wirelessly access a network via a base station 104 and operate in the wireless communication system 100 in accordance with various example embodiments. By way of non-limiting example, the mobile wireless device can comprise a cellular phone, such as a smart phone device, a tablet computing device, a laptop computer, or other computing device that can be configured to wirelessly access a network via a base station 104 or other suitable network access point.

The base station 104 can be associated with a cell serving the wireless communication device 102, and thus can be the serving base station for the wireless communication device 102 within a cellular network to which the wireless communication device 102 can be connected. The base station 104 can be any of a variety of cellular base stations, such as by way of non-limiting example, a base transceiver station (BTS), node B, evolved node B (eNB), femtocell, some combination thereof, or the like.

The base station 104 of some example embodiments can be configured to provide network access to the wireless communication device 102 via any present or future developed cellular radio access technology (RAT). For example, in some embodiments, the base station 104 can be configured to provide network access to the wireless communication device 102 via a fourth generation (4G) cellular RAT, such as a Long Term Evolution (LTE) RAT, including LTE, LTE-Advanced (LTE-A), and/or the like. As another example, in some embodiments, the base station 104 can be configured to provide network access to the wireless communication device 102 via a third generation (3G) RAT, such as a Universal Mobile Telecommunications System (UMTS) RAT, such as Wideband Code Division Multiple Access (WCDMA) or Time Division Synchronous Code Division Multiple Access (TD-SCDMA); a CDMA2000 RAT (e.g., 1xRTT) or other RAT standardized by the Third Generation Partnership Project 2 (3GPP2); and/or other 3G RAT. As a further example, in some embodiments, the base station 104 can be configured to provide network access to the wireless communication device 102 via a second generation (2G) RAT, such as a Global System for Mobile Communications (GSM) RAT, and/or other 2G RAT to access a network. It will be appreciated, however, that the foregoing examples of cellular RATs are provided by way of example, and not by way of limitation. In this regard, other present or future developed cellular RATs, including various fifth generation (5G) RATs now in development, can be used by the base station 104 to provide network access to the wireless communication device 102 within the scope of the disclosure.

While the foregoing examples discuss embodiment of the base station 104 as a cellular base station providing cellular network access to the wireless communication device 102 it will be appreciated that other types of wireless network access points that can be configured to provide network access to the wireless communication device 102 via a non-cellular RAT and that can be configured to send a time zone information message to the wireless communication device 102 are contemplated and can be substituted mutatis mutandis for the base station 104 within the scope of the disclosure. Thus, for example, in some embodiments, a wireless local area network (WLAN) access point, such as can provide network access to wireless communication device 102 via a WLAN RAT, such as an Institute of Electrical and Electronics Engineers (IEEE) standardized Wi-Fi RAT (e.g., IEEE 802.11 a/b/g/n/ac/ad/etc.), can be substituted for base station 104 within the scope of the disclosure.

Figure 2:
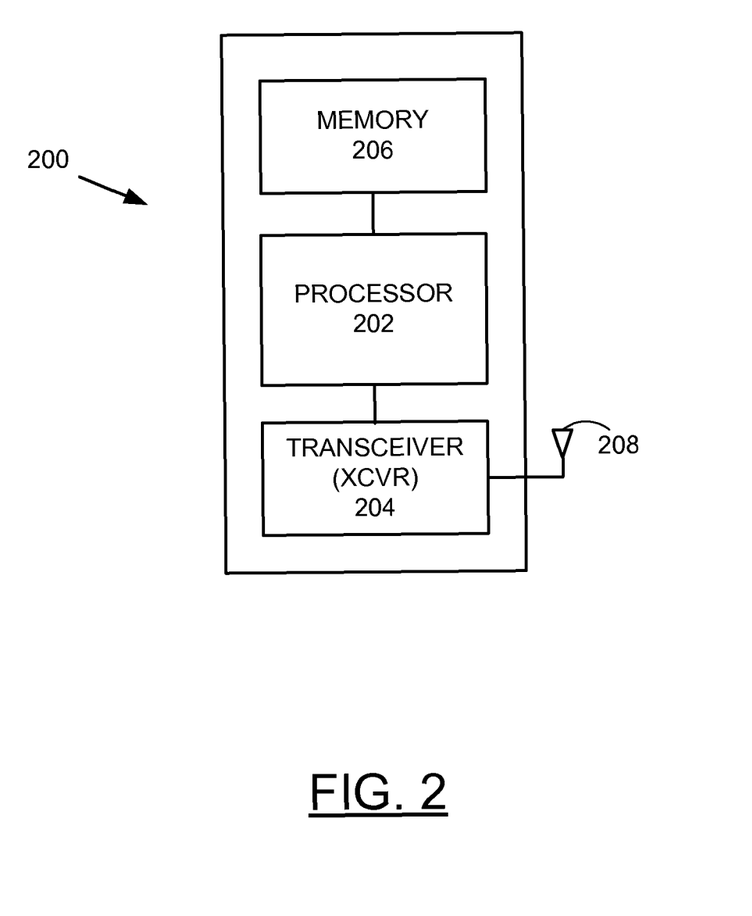
FIG. 2 illustrates a block diagram of an example apparatus that can be implemented on a wireless communication device in accordance with some example embodiments.

FIG. 2 illustrates a block diagram of an example apparatus 200 that can be implemented on a wireless communication device, such as wireless communication device 102, in accordance with some example embodiments. The apparatus 200 can include a processor 202 coupled with memory 206 and also coupled with a wireless transceiver(s) 204. Processor 202 can be configured to read, write and execute processor instructions stored in memory 206. Processor 202 can also be configured to control wireless transceiver(s) 204. In some embodiments, wireless transceiver 204 can connect to wireless networks, via a network access point, such as base station 104. Accordingly, in some such example embodiments, the wireless transceiver 204 can be configured to enable receipt of a time zone information message that can be sent by base station 104 and/or another network access point in accordance with various example embodiments. Further, in some example embodiments, the processor 202 can be configured, such as through hardware, software, firmware, or some combination thereof, to control one or more operations that can be performed by a wireless communication device 102 in accordance with various example embodiments.

Figure 3:
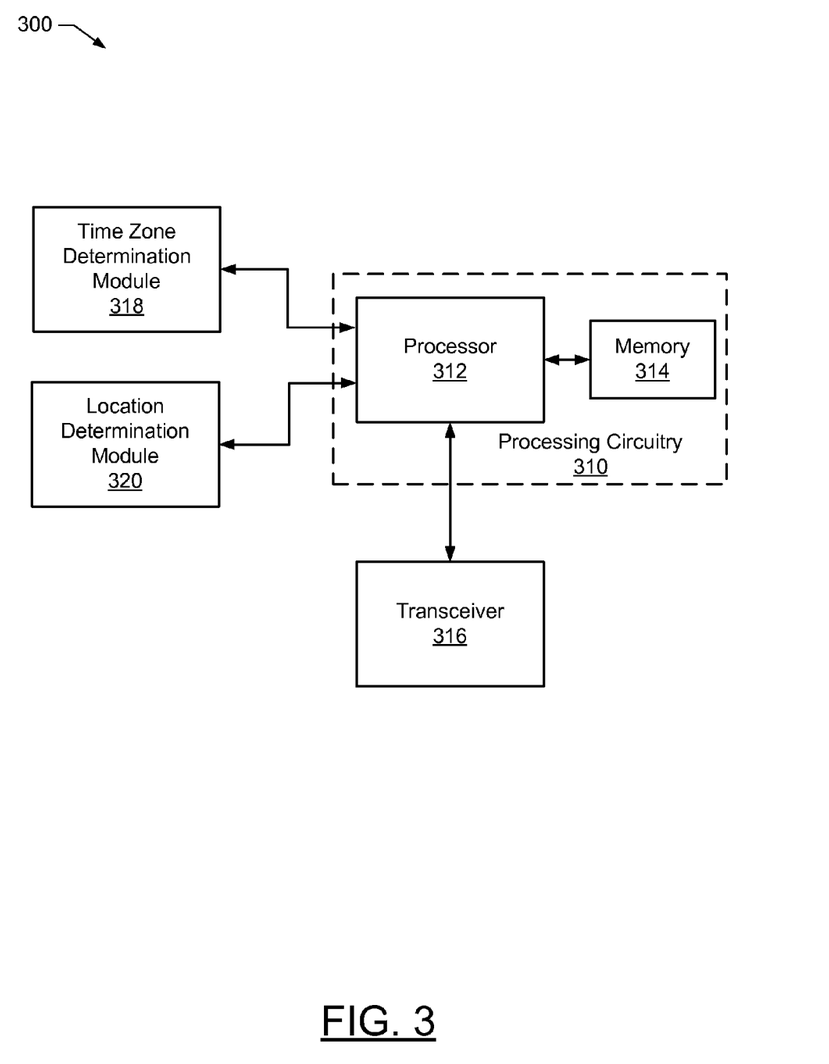
FIG. 3 illustrates a block diagram of another example apparatus that can be implemented on a wireless communication device in accordance with some example embodiments.

FIG. 3 illustrates a block diagram of another example apparatus that can be implemented on a wireless communication device, such as wireless communication device 102, in accordance with some embodiments. In this regard, FIG. 3 illustrates an apparatus 300 that can, when implemented on a computing device, such as wireless communication device 102, enable the computing device to operate within the system 100 in accordance with one or more example embodiments. It will be appreciated that the components, devices or elements illustrated in and described with respect to FIG. 3 below may not be mandatory and thus some may be omitted in certain embodiments. Additionally, some embodiments can include further or different components, devices or elements beyond those illustrated in and described with respect to FIG. 3.

In some example embodiments, the apparatus 300 can include processing circuitry 310 that is configurable to perform actions in accordance with one or more example embodiments disclosed herein. In this regard, the processing circuitry 310 can be configured to perform and/or control performance of one or more functionalities of a wireless communication device in accordance with various example embodiments, and thus can provide means for performing functionalities of wireless communication device 102 in accordance with various example embodiments. The processing circuitry 310 can be configured to perform data processing, application execution and/or other processing and management services according to one or more example embodiments.

In some embodiments, the apparatus 300 or a portion(s) or component(s) thereof, such as the processing circuitry 310, can include one or more chipsets, which can each include one or more chips. The processing circuitry 310 and/or one or more further components of the apparatus 300 can therefore, in some instances, be configured to implement an embodiment on a single chip or chipset. In some example embodiments in which one or more components of the apparatus 300 are embodied as a chipset, the chipset can be capable of enabling a computing device to operate in the system 100 when implemented on or otherwise operably coupled to the computing device.

In some example embodiments, the processing circuitry 310 can include a processor 312 and, in some embodiments, such as that illustrated in FIG. 3, can further include memory 314. The processor 312 can, for example, be an embodiment of the processor 202. The memory 314 can, for example, be an embodiment of the memory 206. As such, in some example embodiments, the processing circuitry 310 can be at least partially embodied by the processor 202 and/or memory 206. The processing circuitry 310 can be in communication with, control, and/or otherwise be coupled with a transceiver 316, time zone determination module 318, and/or location determination module 320.

The processor 312 can be embodied in a variety of forms. For example, the processor 312 can be embodied as various hardware-based processing means such as a microprocessor, a coprocessor, a controller or various other computing or processing devices including integrated circuits such as, for example, an ASIC (application specific integrated circuit), an FPGA (field programmable gate array), some combination thereof, or the like. Although illustrated as a single processor, it will be appreciated that the processor 312 can comprise a plurality of processors. The plurality of processors can be in operative communication with each other and can be collectively configured to perform one or more functionalities of a wireless communication device as described herein. In some example embodiments, the processor 312 can be configured to execute instructions that can be stored in the memory 314 or that can be otherwise accessible to the processor 312. As such, whether configured by hardware or by a combination of hardware and software, the processor 312 capable of performing operations according to various embodiments while configured accordingly.

In some example embodiments, the memory 314 can include one or more memory devices. Memory 314 can include fixed and/or removable memory devices. In some embodiments, the memory 314 can provide a non-transitory computer-readable storage medium that can store computer program instructions that can be executed by the processor 312. In this regard, the memory 314 can be configured to store information, data, applications, instructions and/or the like for enabling the apparatus 300 to carry out various functions in accordance with one or more example embodiments. In some embodiments, the memory 314 can be in communication with one or more of the processor 312, transceiver 316, time zone determination module 318, or location determination module 320 via a bus (or buses) for passing information among components of the apparatus 300.

The apparatus 300 can further include one or more transceivers 316. The transceiver 316 can, for example, be an embodiment of the transceiver 204. The transceiver 316 can be configured to enable the apparatus 300 to send (e.g., transmit) wireless signals to and receive wireless signals from a wireless network via a connection to a wireless network access point, such as the base station 104. As such, the transceiver 316 can be configured to support any type of RAT that may be used to support communication over a wireless channel between a wireless communication device and a network. Thus, for example, the transceiver 316 can be configured to support communication via any type of RAT that can be used for communication between the wireless communication device 102 and a base station 104 and/or other wireless network access point.

The apparatus 300 can further include time zone determination module 318. The time zone determination module 318 can be embodied as various means, such as circuitry, hardware, a computer program product comprising a computer readable medium (for example, the memory 314) storing computer readable program instructions that are executable by a processing device (for example, the processor 312), or some combination thereof. The time zone determination module 318 can be configured to determine a current time zone for a wireless communication device, such as wireless communication device 102, in accordance with one or more example embodiments disclosed herein.

The apparatus 300 can further include location determination module 320. The location determination module 320 can be embodied as various means, such as circuitry, hardware, a computer program product comprising a computer readable medium (for example, the memory 314) storing computer readable program instructions that are executable by a processing device (for example, the processor 312), or some combination thereof. The location determination module 320 can be configured to determine a location of the wireless communication device 102 via any one or more of a variety of techniques. For example, in some example embodiments, the location determination module 320 can be embodied as or otherwise include a satellite navigation service sensor, such as a Global Positioning System (GPS) sensor, a Global Navigation Satellite System (GLONASS) sensor, Compass navigation system sensor, Galileo positioning system sensor, and/or the like, which can be configured to use a satellite positioning system to determine a location of the wireless communication device 102. As a further example, in some example embodiments, the location determination module 320 can be configured to determine a location of the wireless communication device 102 through application of techniques such as assisted GPS, signal triangulation, location determination based on a location identifier that can be sensed from a WLAN, location determination based on a cell ID for a serving cell, and/or the like. A location that can be determined by the location determination module 320 can, for example, include a coordinate location, a street address, a name of a political region (e.g., city, town, state, country, municipality, and/or the like) in which the wireless communication device 102 can be located, and/or other location reference that can be correlated to a time zone containing the location.

The base station 104 of some example embodiments can be configured to send a time zone information message to the wireless communication device 102. By way of non-limiting example, the time zone information message can be a NITZ message. As a further example, the time zone information message can be a sync channel message, such as can be sent by a code division multiple access (CDMA) network. However, it will be appreciated that messages other than NITZ messages and sync channel messages that can include information enabling a wireless communication device 102 to identify a time zone are contemplated within the scope of the disclosure.

A time zone information message that can be sent by the base station 104 can include an indication of a time zone in which the base station 104 is located. In this regard, the time zone information message can include a set of time zone identification parameters that can be used by the wireless communication device 102 of some example embodiments to derive the time zone in which the base station 104 is located, which can be considered a current time zone for the wireless communication device 102. By way of non-limiting example, the set of time zone identification parameters can include a time stamp for a time at which the time zone information message was sent. The time stamp can be expressed in terms of a global standardized time, such as Coordinated Universal Time (UTC), also known as Greenwich Mean Time (GMT). The set of time zone identification parameters can additionally or alternatively include an offset from a standardized time, such as a UTC offset. The set of time zone identification parameters can further include a DST flag and/or other indication indicating whether DST is currently in effect in the time zone.

The wireless communication device 102 of some example embodiments can use time zone identification parameters included in a received time zone information message to determine a time zone corresponding to the time zone identification parameters. In this regard, the wireless communication device 102 of such example embodiments can have access to a listing, database, or other data structure having a set of time zones that can be identified based at least in part on parameters such as a UTC offset and a DST flag. For example, the wireless communication device 102 can use the time zone identification parameters to identify a matching Internet Assigned Numbers Authority (IANA) time zone, also sometimes referred to as an "Olson time zone." It will be appreciated, however, that other time zone naming conventions that presently exist or that may be developed in the future can be used in addition to or in lieu of IANA time zone identifiers in accordance with some example embodiments. The matching time zone can carry additional information about the time zone, such as DST transition dates that can be used by the wireless communication device 102 to update its local time on appropriate dates/times to account for occurrence of DST transitions.

Figure 4:
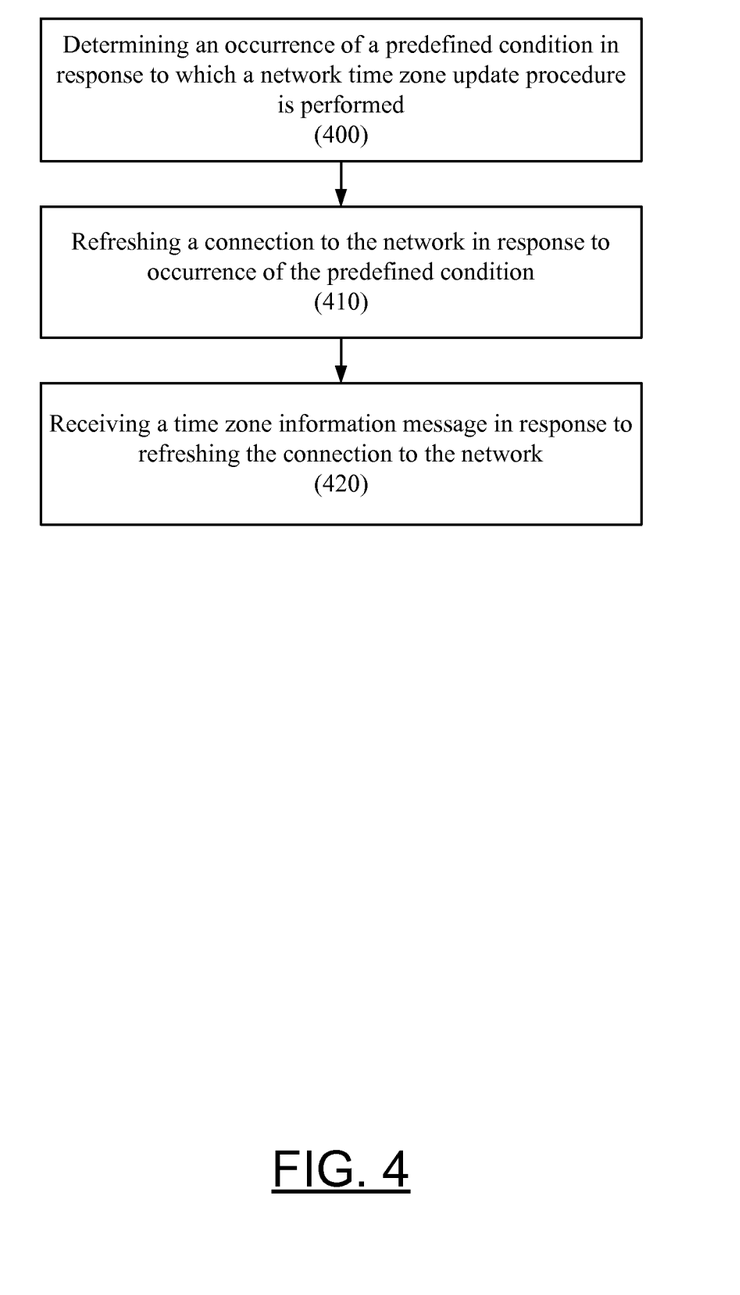
FIG. 4 illustrates a flowchart according to an example method for soliciting a time zone information message from a network in accordance with some example embodiments.

In some example embodiments, the wireless communication device 102 can be configured to provoke the network (e.g., the serving base station 104) to send a time zone information message, such as in response to occurrence of one or more predefined conditions. FIG. 4 illustrates a flowchart of a method for soliciting a time zone information message from a network in accordance with some such embodiments. In this regard, FIG. 4 illustrates operations that can be performed by a wireless communication device, such as wireless communication device 102, in accordance with some example embodiments. One or more of processor 202, transceiver 204, memory 206, processing circuitry 310, processor 312, memory 314, transceiver 316, time zone determination module 318, or location determination module 320 can, for example, provide means for performing one or more of the operations illustrated in and described with respect to FIG. 4.

Operation 400 can include the wireless communication device 102 determining an occurrence of a predefined condition in response to which a network time zone update procedure is performed. The condition determined to occur in operation 400 can include any of a variety of conditions for which it may be desirable for the wireless communication device 102 to obtain updated time zone information from the network in accordance with various example embodiments. As an example, the predefined condition can be a knowledge or belief on the part of the wireless communication device 102 that a DST transition has occurred, or that a DST transition is about to occur (e.g., is going to occur within a defined time window). In such situations, the wireless communication device 102 may determine to receive updated time zone information from the network to confirm the DST transition (e.g., shortly after the suspected transition). Additionally or alternatively, in such example embodiments, the wireless communication device 102 can determine to receive confirmation of the DST transition date in advance of the suspected DST transition. In this regard, governing bodies that regulate DST transition dates often modify DST dates from year to year. As such, DST transition dates may have changed from a time of a last update. Further, in instances of time zone ambiguity, such as in the case of ambiguity over whether a user is in the America/Phoenix time zone or in the America/Denver time zone, the wireless communication device 102 can determine to provoke the network to send a time zone update message so as to receive updated time zone information after a suspected transition to ensure a user is placed in the appropriate time zone if the user is in a region such as Arizona that does not observe DST transitions and/or that uses different DST transition dates than other regions within a larger time zone.

As a further example, a condition that can be determined to occur at operation 400 can include determining that a location-based time zone (e.g., a time zone corresponding to a derived location of the wireless communication device 102 that can be determined by the location determination module 320) conflicts with a time zone indicated in the last time zone information message received from the network. In such cases, the wireless communication device 102 of some example embodiments can be configured to determine to provoke the network to send an updated time zone information message so that the location-based time zone can be confirmed or rejected. Accordingly, the wireless communication device 102 of some example embodiments can be configured to determine to provoke the network to send a time zone information message and perform a time zone update procedure in response to a time zone conflict that can occur in situations such as recent time zone border crossings, time zone ambiguity such as in the case of ambiguity over whether a device is located in the America/Phoenix time zone or the America/Denver time zones, and/or other situations that can result in a location-based time zone conflict.

As still a further example, a condition that can be determined to occur at operation 400 by the wireless communication device 102 of some example embodiments can include enforcement of a time zone freshness policy. In this regard, in some example embodiments, if the last time zone information message from the network was received more than some threshold period of time ago, the wireless communication device 102 can be configured to determine to provoke the network to send a time zone information message and perform a time zone update procedure. For example, in some such embodiments, a timeout period can be set following receipt of a time zone information message, and if a new time zone information message is not received within the time out period, the wireless communication device 102 can determine to provoke the network to send a time zone information message and perform a time zone update procedure. By way of non-limiting example, in some example embodiments, if the wireless communication device 102 is served by a CDMA network and does not receive a time zone information message within 24 hours of a last received time zone information message, the wireless communication device 102 can determine to provoke the network to send another time zone information message.

As yet another example, a condition that can be determined to occur at operation 400 by the wireless communication device 102 of some example embodiments can include activation of an automatic time zone update feature that can be implemented on the wireless communication device 102. In this regard, the wireless communication device 102 of some example embodiments can be configured in a manual update mode in which a user can manually select a device time zone or can be configured in an automatic mode in which the device can automatically determine and update its time zone. If the automatic mode is activated, then the wireless communication device 102 can determine to provoke the network to send a time zone information message and perform a time zone update procedure in accordance with update policies that can be configured and/or otherwise defined for the automatic mode.

In some example embodiments, operation 400 can be performed at least partially under control of a daemon that can determine when an updated time zone information message from the network is desired. In such embodiments, if the daemon determines that a condition is satisfied, then a time zone update procedure can be performed.

If the wireless communication device 102 determines to perform a time zone update procedure in response to occurrence of a predefined condition in operation 400, then the time zone update procedure can include operation 410, which can include the wireless communication device 102 refreshing a connection to the serving network (e.g., a connection to the base station 104). In this regard, some networks can be configured to send a NITZ message and/or other time zone information message in response to a device registering to the network. Accordingly, by actively refreshing a network condition, the wireless communication device 102 of some example embodiments can provoke the network to send a time zone information message. In some example embodiments, refreshing the network connection can include the wireless communication device 102 deregistering from the network and reregistering with the network.

Operation 420 can include the wireless communication device 102 receiving a time zone information message from the network in response to refreshing its connection to the network. The wireless communication device 102 can use the time zone information message to facilitate performance of a time zone update. For example, the wireless communication device 102 can use a set of time zone identification parameters that can be included in the time zone information message to derive a current time zone, determine one or more candidate time zones for the current time zone, confirm or reject a location-based time zone (e.g., a time zone determined based on a location of the wireless communication device 102), and/or the like.

In some example embodiments, the wireless communication device 102 can be configured to control a timing of performance of operation 410 so as to not interfere with other operations of the wireless communication device 102. For example, in some embodiments, if the wireless communication device 102 is engaged in an active voice call, data call, data session, and/or the like, then operation 410 can be delayed until a time at which performance of operation 410 would not lead to call drop or otherwise impact user experience. In some such embodiments, data sessions can be prioritized. For example, in some embodiments, performance of operation 410 may not be delayed for data transfer attendant to email exchange, but may be delayed for a data call. As another example, in some embodiments, a data session or other communication requiring a certain quality of service or throughput threshold can be prioritized over data sessions not including such constraints. Thus, for example, in some embodiments, operation 410 may be delayed for a communication having a certain priority level, but may not be delayed for non-prioritized communications and/or communications that do not meet a priority level threshold.

In embodiments in which the timing of performance of operation 410 is controlled to avoid interference with other operations of the wireless communication device 102, a request to perform a time zone update procedure that can be generated in response to determining an occurrence of a predefined condition at operation 400 can be generated as an asynchronous request at an application layer. A baseband or telephony layer can receive the asynchronous request and can determine whether refreshing the connection would interfere with any ongoing sessions over the connection and, if so, can delay refreshing the connection.

In some example embodiments, the wireless communication device 102 can be configured to selectively perform operation 410 based on a likelihood of successfully receiving a time zone information message from the network in response to refreshing the connection. In this regard, some networks may not support time zone information messages and/or may not send time zone information messages in response to a device registering to the network. If the wireless communication device 102 is camped on a network known by the wireless communication device 102 to not support time zone information messages and/or to not send time zone information messages in response to registration to the network, then the wireless communication device 102 of some example embodiments can determine to not perform operation 410.

The wireless communication device 102 of some example embodiments can be configured to determine whether a derived location-based time zone is a valid time zone for a country in which a serving base station, such as the base station 104, is located. If the location-based time zone is a valid time zone for the country in which the base station 104 is located, the location-based time zone can be further considered as a possible current time zone for the wireless communication device 104. If, however, the location-based time zone is not a valid time zone for the country in which the base station 104 is located, the location-based time zone can be discarded as invalid, and thus filtered from further consideration. Accordingly, location-based time zone selection can be biased in instances in which time zone information messages are not available from the serving network and/or there is otherwise ambiguity as to the time zone in which the wireless communication device 102 is located.

Figure 5:
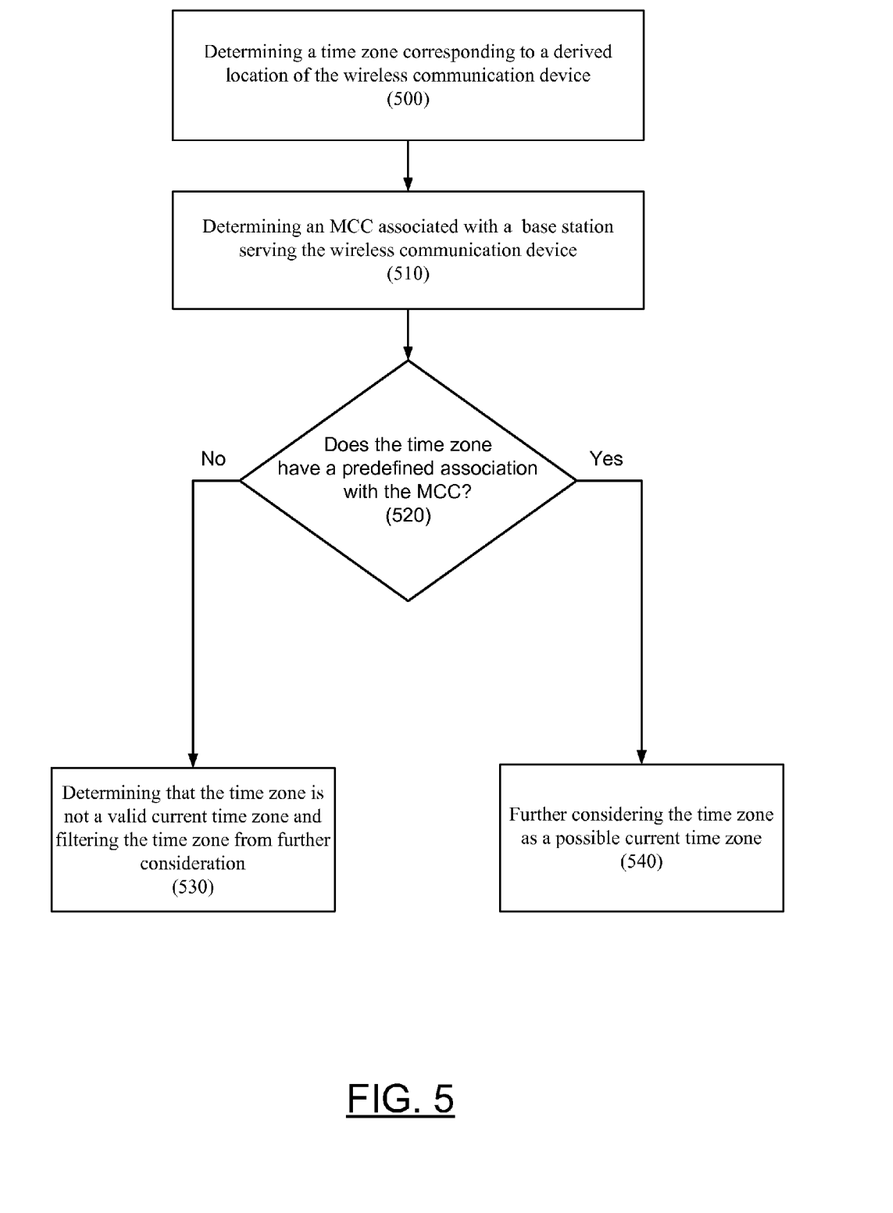
FIG. 5 illustrates a flowchart according to an example method for using a mobile country code to bias location-based time zone selection in accordance with some example embodiments.

FIG. 5 illustrates a flowchart according to an example method for using a mobile country code to bias location-based time zone selection in accordance with some example embodiments. In this regard, FIG. 5 illustrates operations that can be performed by a wireless communication device, such as wireless communication device 102, in accordance with some example embodiments. One or more of processor 202, transceiver 204, memory 206, processing circuitry 310, processor 312, memory 314, transceiver 316, time zone determination module 318, or location determination module 320 can, for example, provide means for performing one or more of the operations illustrated in and described with respect to FIG. 5.

Operation 500 can include the wireless communication device 102 determining a time zone corresponding to a derived location of the wireless communication device 102 (e.g., a location-based time zone). The derived location can be derived through use of any location determining hardware, algorithms, and/or the like that can be implemented on the wireless communication device 102. For example, the location can be derived through a satellite positioning system, such as Global Positioning System (GPS), assisted GPS, a cell ID for the serving cell, an identifier on a wireless local area network (WLAN) sensed by the wireless communication device 102, and/or other techniques that can be used to determine a location. In embodiments in which the wireless communication device 102 includes a location determination module 320, the location can be derived by the location determination module 320.

Operation 510 can include determining a mobile country code (MCC) associated with the base station 104. In this regard, the MCC can be an identifier uniquely identifying a country in which the base station 104 is located. The MCC can be determined based on network signaling that can be received by the wireless communication device 102. For example, the base station 104 of some embodiments, such as some embodiments in which the base station 104 is implemented as part of a Global System for Mobile Communications (GSM) network, can explicitly signal its corresponding MCC. As another example, in some embodiments, such as some embodiments in which the base station 104 is implemented as part of a CDMA network, network signaling can include information from which the wireless communication device 102 can compute a logical MCC from the signaled information. For example, in some embodiments, the wireless communication device 102 can be configured to derive an MCC based at least in part on a SID/NID (System Identification number/Network identification number) value that can be signaled by the base station 104, such as by using a lookup table of SID/NID values. The lookup table of SID/NID values can, for example, be stored on the wireless communication device 102. As another example, the lookup table of SID/NID values can be accessed by the wireless communication device 102 from a remote source via a network connection.

Operation 520 can include the wireless communication device 102 determining whether the location-based time zone is a time zone having a predefined association with the MCC. In this regard, the wireless communication device 102 can be configured to access a list of time zones associated with the MCC. The time zones having a predefined association with the MCC can include those time zones located in the country identified by the MCC. Further, in some instances, the time zones having a predefined association with the MCC can include a coded exception(s) (e.g., when an MCC is known to be used outside of its primary country) and/or an additional time zone(s) known to be a valid possible time zone for an area using the MCC. In some example embodiments, a list of time zones having a predefined association with the MCC can include a list of one or more primary entries comprised of time zones from a real/primary country identified by the MCC and, if applicable, one or more secondary entries comprised of time zones from secondary countries that are known to be valid options for the MCC. The secondary entries can, for example, be defined based on real cases of a time zone being known to be a valid time zone for the MCC and/or due to collisions in a SID/NID->MCC mapping.

In some embodiments, a database, table, or other data structure can be indexed by MCC values and each respective MCC in the data structure can be associated with a list of one or more time zones. The wireless communication device 102 can determine whether the location-based time zone is in the list associated with the MCC. If the location-based time zone is not in the list, then the time zone can be deemed an invalid current time zone for the wireless communication device 102 and can be filtered from further consideration as the current time zone for the wireless communication device 102, as illustrated by operation 530. If, however, the location-based time zone is in the list, then the time zone can be further considered as a possible current time zone for the wireless communication device 102, as illustrated by operation 540. In this regard, the time zone can be subjected to further validity/selection processing and/or can be selected as a current time zone for the wireless communication device. As such, embodiments such as that illustrated in FIG. 5 can apply MCC filtering to eliminate potentially invalid location-based time zones in situations such as border crossings.

The wireless communication device 102 of some example embodiments can be configured to use a location derived for the device to refine network-provided time zone information, such as can be received in a time zone information message. The derived location can be derived through use of any location determining hardware, algorithms, and/or the like that can be implemented on the wireless communication device 102. For example, the location can be derived through a satellite positioning system, such as GPS, assisted GPS, a cell ID for the serving cell, an identifier on a WLAN sensed by the wireless communication device 102, and/or other techniques that can be used to determine a location. In some example embodiments, the location can be derived by the location determination module 320.

Figure 6:
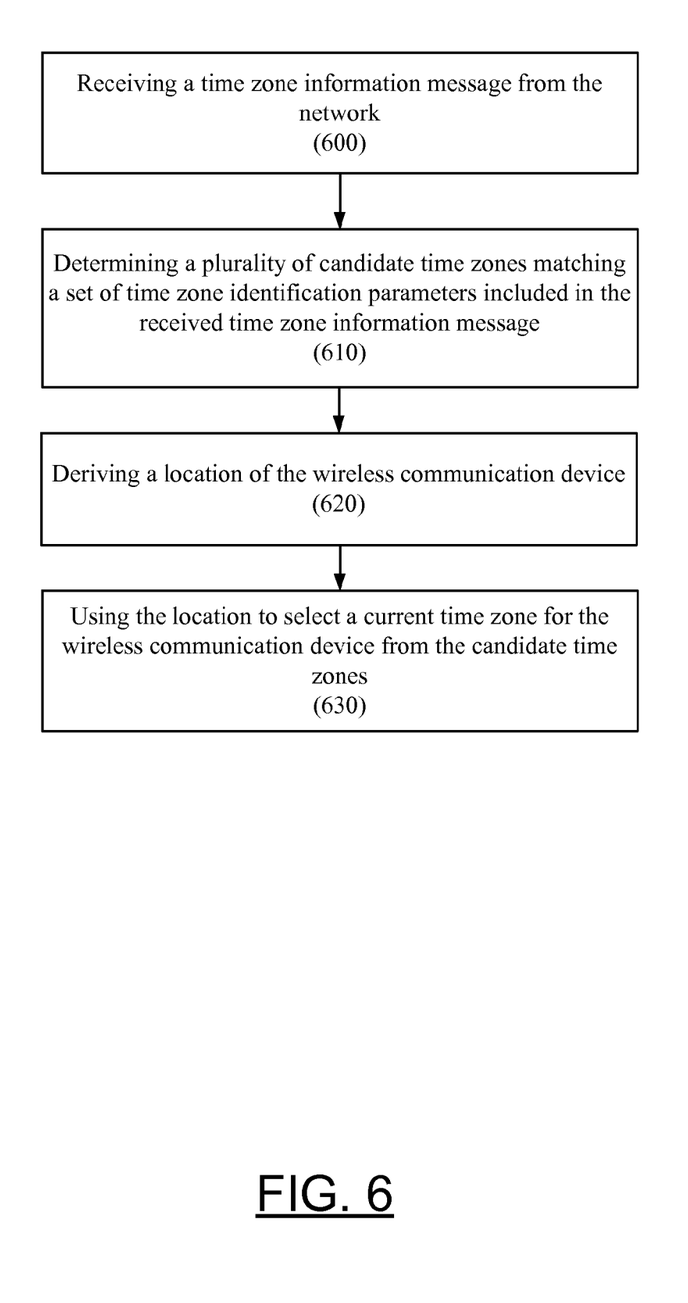
FIG. 6 illustrates a flowchart according to an example method for using a location to refine network-provided time zone information in accordance with some example embodiments.

FIG. 6 illustrates a flowchart according to an example method for using a location to refine network-provided time zone information in accordance with some example embodiments. In this regard, FIG. 6 illustrates operations that can be performed by a wireless communication device, such as wireless communication device 102, in accordance with some example embodiments. One or more of processor 202, transceiver 204, memory 206, processing circuitry 310, processor 312, memory 314, transceiver 316, time zone determination module 318, or location determination module 320 can, for example, provide means for performing one or more of the operations illustrated in and described with respect to FIG. 6.

Operation 600 can include the wireless communication device 102 receiving a time zone information message from the network. In some example embodiments, the received time zone information message can be sent to the wireless communication device 102 without provocation or request by the wireless communication device 102. Additionally or alternatively, in some example embodiments, the received time zone information message can be sent to the wireless communication device 102 in response to a request or other action by the wireless communication device 102 that can trigger the network to send a time zone information message. For example, in some embodiments, such as that illustrated in and described below with respect to FIG. 7, the wireless communication device 102 can refresh a connection to the network to trigger the network to send a time zone information message so that the wireless communication device 102 can perform a time zone update procedure.

Operation 610 can include the wireless communication device 102 determining a plurality of candidate time zones matching a set of time zone identification parameters included in the received time zone information message. For example, some combination of a time stamp on the message, a UTC offset, a DST flag and/or other indication indicating whether DST is currently in effect in the time zone, MCC, and/or the like can be used to identify time zones matching the set of time zone identification parameters.

As a hypothetical example, the time zone information message can indicate a UTC offset of "−7" and a DST flag of "0," indicating that DST is not in effect. If America/Denver is in Mountain Daylight Time (MDT) at the time the time zone information message was sent, as can be determined based at least in part on a time stamp on the time zone information message, then America/Phoenix can be determined as the time zone for the wireless communication device 102 without having to refine or otherwise supplement the network indicated time zone through performance of operation 620. However, if America/Denver is in Mountain Standard Time, then both America/Phoenix and America/Denver can match the set of time zone identification parameters included in the time zone information message. In this regard, both America/Phoenix and America/Denver can have a DST status and UTC offset matching the DST flag and UTC offset included in the time zone information message at the time indicated by the time stamp on the time zone information message.

Operation 620 can include the wireless communication device 102 deriving a location of the wireless communication device 102. The location can be derived through use of any location determining hardware, algorithms, and/or the like that can be implemented on the wireless communication device 102. For example, the location can be derived through a satellite positioning system, such as GPS, assisted GPS, a cell ID for the serving cell, an identifier on a WLAN sensed by the wireless communication device 102, and/or other techniques that can be used to determine a location. In some example embodiments, the location can be derived by the location determination module 320. It will be appreciated that the ordering of operation 620 within the method of FIG. 6 is not limited to occurring following operation 610. Thus, while in some embodiments, the location can be derived in response to determining that there are multiple candidate time zones matching the set of time zone identification parameters included in the received time zone information message, in some example embodiments, a location derived prior to performance of operation 610 can be used.

Operation 630 can include using the derived location to select a current time zone for the wireless communication device 102 from the candidate time zones determined in operation 610. Thus, for example, if both America/Denver and America/Phoenix are identified as matching the time zone identification parameters, a location of the wireless communication device 102 can be used to select between the possible matches. In this regard, operation 630 can include determining a candidate time zone in which the location is located. For example, in some example embodiments, operation 630 can include determining a location-derived time zone associated with the location and selecting a candidate time zone corresponding to the location-derived time zone associated with the location as the current time zone for the wireless communication device.

In some such embodiments, MCC filtering, such as discussed with respect to FIG. 5 can be used to filter or otherwise validate a location-refined time zone. Additionally or alternatively, in some example embodiments, such as that illustrated in and described with respect to FIG. 8 below, MCC filtering can be used to validate a location-based time zone prior to use for refining network-provided time zone information.

Figure 7:
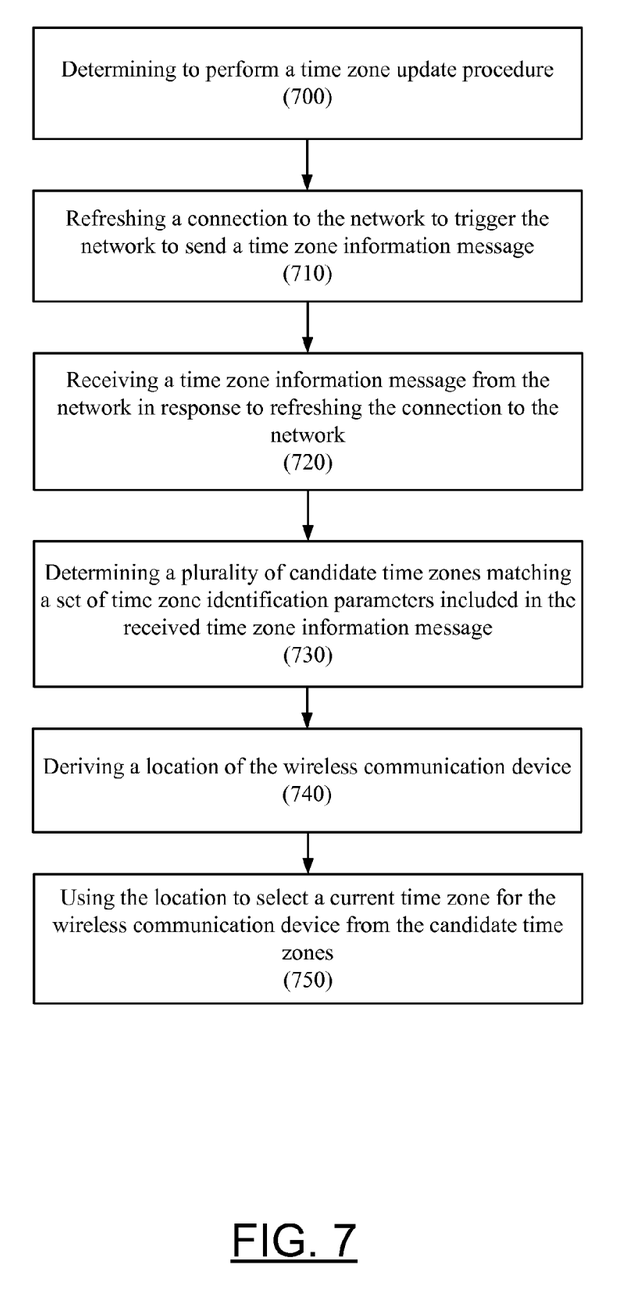
FIG. 7 illustrates a flowchart according to another example method for using a location to refine network-provided time zone information in accordance with some example embodiments.

FIG. 7 illustrates a flowchart according to another example method for using a location to refine network-provided time zone information in accordance with some example embodiments. In this regard, FIG. 7 illustrates operations that can be performed by a wireless communication device, such as wireless communication device 102, in accordance with some example embodiments. More particularly, FIG. 7 illustrates an example embodiment of the method of FIG. 6 in which the wireless communication device 102 can determine to perform a time zone update procedure and refresh a connection to the serving network to trigger the network to send a time zone information message in accordance with an embodiment illustrated in and described with respect to FIG. 4. One or more of processor 202, transceiver 204, memory 206, processing circuitry 310, processor 312, memory 314, transceiver 316, time zone determination module 318, or location determination module 320 can, for example, provide means for performing one or more of the operations illustrated in and described with respect to FIG. 7.

Operation 700 can include the wireless communication device 102 determining to perform a time zone update procedure. For example, the wireless communication device 102 can determine that a predefined condition in response to which a time zone update procedure is performed has occurred. In this regard, operation 700 can, for example, correspond to an embodiment of operation 400.

Operation 710 can include the wireless communication device 102 refreshing a connection to the network to trigger the network to send a time zone information message. In this regard, operation 710 can, for example, correspond to an embodiment of operation 410. Operation 720 can include the wireless communication device 102 receiving a time zone information message from the network in response to refreshing the connection to the network. In this regard, operation 720 can, for example, correspond to an embodiment of operation 420 and/or operation 600.

Operation 730 can include the wireless communication device 102 determining a plurality of candidate time zones matching a set of time zone identification parameters included in the received time zone information message. Operation 740 can include the wireless communication device 102 deriving a location of the wireless communication device 102. Operation 750 can include the wireless communication device 102 using the location to select a current time zone for the wireless communication device from the candidate time zones. In this regard, operations 730-750 can, for example, correspond to embodiments of operations 610-630, respectively.

Figure 8:
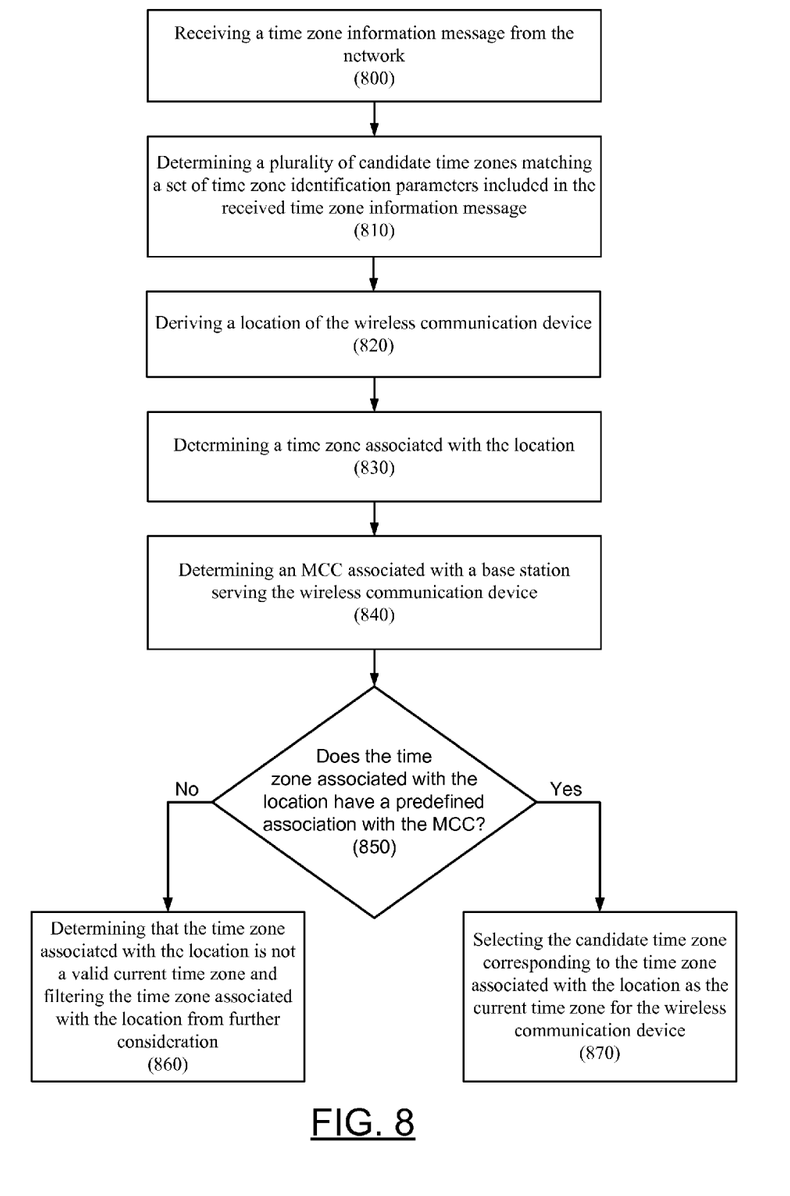
FIG. 8 illustrates a flowchart according to a further example method for using a location to refine network-provided time zone information in accordance with some example embodiments.

FIG. 8 illustrates a flowchart according to a further example method for using a location to refine network-provided time zone information in accordance with some example embodiments. In this regard, FIG. 8 illustrates operations that can be performed by a wireless communication device, such as wireless communication device 102 in accordance with some example embodiments. More particularly, FIG. 8 illustrates an example embodiment of the method of FIG. 6 in which the wireless communication device 102 can be configured to perform MCC filtering in accordance with an embodiment illustrated in and described with respect to FIG. 5 to validate a location-based time zone prior to use for refining network-provided time zone information. One or more of processor 202, transceiver 204, memory 206, processing circuitry 310, processor 312, memory 314, transceiver 316, time zone determination module 318, or location determination module 320 can, for example, provide means for performing one or more of the operations illustrated in and described with respect to FIG. 8.

Operation 800 can include the wireless communication device 102 receiving a time zone information message from the network. In this regard, operation 800 can, for example, correspond to an embodiment of operation 600 and/or operation 720. Operation 810 can include the wireless communication device 102 determining a plurality of candidate time zones matching a set of time zone identification parameters included in the received time zone information message. In this regard, operation 810 can, for example, correspond to an embodiment of operation 610 and/or operation 730. Operation 820 can include the wireless communication device 102 deriving a location of the wireless communication device 102. In this regard, operation 820 can, for example, correspond to an embodiment of operation 620 and/or operation 740.

Operation 830 can include the wireless communication device 102 determining a time zone associated with the location. In this regard, operation 830 can, for example, correspond to an embodiment of operation 500. Operation 830 can include the wireless communication device 102 determining an MCC associated with a base station (e.g., base station 104) serving the wireless communication device 102. In this regard, operation 840 can, for example, correspond to an embodiment of operation 510.

Operation 850 can include the wireless communication device 102 determining whether the time zone associated with the location has a predefined association with the MCC. In this regard, operation 850 can, for example, correspond to an embodiment of operation 520.

In an instance in which it is determined at operation 850 that the time zone associated with the location does not have a predefined association with the MCC, the method can proceed to operation 860, which can include the wireless communication device 102 determining that the time zone associated with the location is not a valid current time zone and filtering the time zone associated with the location from further consideration. In this regard, operation 860 can, for example, correspond to an embodiment of operation 530.

If, however, it is instead determined at operation 850 that the time zone associated with the location does have a predefined association with the MCC, the method can proceed to operation 870, which can include the wireless communication device 102 selecting the candidate time zone corresponding to the time zone associated with the location as the current time zone for the wireless communication device 102. In this regard, operation 870 can, for example, correspond to an embodiment of operation 540.

Operations 830-870 can, for example, correspond to an embodiment of operation 630 and/or operation 750.

The various aspects, embodiments, implementations or features of the described embodiments can be used separately or in any combination. Various aspects of the described embodiments can be implemented by software, hardware or a combination of hardware and software. The described embodiments can also be embodied as computer readable code on a computer readable medium for controlling manufacturing operations or as computer readable code on a computer readable medium for controlling a manufacturing line. The computer readable medium is any data storage device that can store data which can thereafter be read by a computer system. Examples of the computer readable medium include read-only memory, random-access memory, CD-ROMs, HDDs, DVDs, magnetic tape, and optical data storage devices. The computer readable medium can also be distributed over network-coupled computer systems so that the computer readable code is stored and executed in a distributed fashion.

In the foregoing detailed description, reference was made to the accompanying drawings, which form a part of the description and in which are shown, by way of illustration, specific embodiments in accordance with the described embodiments. Although these embodiments are described in sufficient detail to enable one skilled in the art to practice the described embodiments, it is understood that these examples are not limiting; such that other embodiments may be used, and changes may be made without departing from the spirit and scope of the described embodiments. For example, it will be appreciated that the ordering of operations illustrated in the flowcharts is non-limiting, such that the ordering of two or more operations illustrated in and described with respect to a flowchart can be changed in accordance with some example embodiments. As another example, it will be appreciated that in some embodiments, one or more operations illustrated in and described with respect to a flowchart can be optional, and can be omitted.

Further, the foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of specific embodiments are presented for purposes of illustration and description. The description of and examples disclosed with respect to the embodiments presented in the foregoing description are provided solely to add context and aid in the understanding of the described embodiments. The description is not intended to be exhaustive or to limit the described embodiments to the precise forms disclosed. It will be apparent to one of ordinary skill in the art that many modifications, alternative applications, and variations are possible in view of the above teachings. In this regard, one of ordinary skill in the art will readily appreciate that the described embodiments may be practiced without some or all of these specific details. Further, in some instances, well known process steps have not been described in detail in order to avoid unnecessarily obscuring the described embodiments.

What is claimed is:

1. A method for using a location to refine network-provided time zone information, the method comprising a wireless communication device:
   receiving a time zone information message from a cellular network;
   determining a plurality of candidate time zones matching a set of time zone identification parameters included in the received time zone information message;
   deriving a location of the wireless communication device; and
   using the location to select a current time zone for the wireless communication device from the candidate time zones.

2. The method of claim 1, wherein using the location to select the current time zone comprises selecting a candidate time zone in which the location is located.

3. The method of claim 1, wherein using the location to select the current time zone comprises the wireless communication device:
   determining a time zone associated with the location; and
   selecting a candidate time zone corresponding to the time zone associated with the location as the current time zone for the wireless communication device.

4. The method of claim 3, further comprising the wireless communication device:
   determining a mobile country code (MCC) associated with a base station serving the wireless communication device in the cellular network;
   determining whether the time zone associated with the location has a predefined association with the MCC;
   selecting the candidate time zone corresponding to the time zone associated with the location as the current time zone for the wireless communication device only in an instance in which it is determined that the time zone associated with the location has a predefined association with the MCC; and
   in an instance in which it is determined that the time zone associated with the location does not have a predefined association with the MCC, determining that the time zone associated with the location is not a valid current time zone for the wireless communication device and filtering the time zone associated with the location from further consideration as the current time zone for the wireless communication device.

5. The method of claim 1, wherein the set of time zone identification parameters comprises an indication of whether daylight savings time (DST) is in effect and a Coordinated Universal Time (UTC) offset, and wherein determining the plurality of candidate time zones comprises determining a plurality of time zones having a DST status and UTC offset matching the indication of whether DST is in effect and the UTC offset included in the time zone information message.

6. The method of claim 1, wherein determining the plurality of candidate time zones comprises determining a plurality of Internet Assigned Numbers Authority (IANA) time zones matching the set of time zone identification parameters.

7. The method of claim 1, wherein the time zone information message is a Network Identity and Time Zone (NITZ) message.

8. The method of claim 1, wherein the cellular network is a code division multiple access (CDMA) network, and wherein the time zone information message is a sync channel message from the CDMA network.

9. The method of claim 1, further comprising the wireless communication device:
   refreshing a connection to the cellular network to trigger the cellular network to send the time zone information message; and
   receiving the time zone information message in response to refreshing the connection to the cellular network.

10. The method of claim 9, wherein refreshing the connection to the cellular network comprises the wireless communication device:
    deregistering from the cellular network; and
    reregistering with the cellular network.

11. A wireless communication device comprising:
    a transceiver configured to transmit data to and receive data from a wireless network; and
    processing circuitry coupled with the transceiver, the processing circuitry configured to control the wireless communication device to at least:
       receive a time zone information message from the wireless network;
       determine a plurality of candidate time zones matching a set of time zone identification parameters included in the received time zone information message;
       derive a location of the wireless communication device; and
       use the location to select a current time zone for the wireless communication device from the candidate time zones.

12. The wireless communication device of claim 11, wherein the processing circuitry is further configured to control the wireless communication device to use the location to select the current time zone at least in part by controlling the wireless communication device to:
    determine a time zone associated with the location; and
    select a candidate time zone corresponding to the time zone associated with the location as the current time zone for the wireless communication device.

13. The wireless communication device of claim 11, wherein the set of time zone identification parameters comprises an indication of whether daylight savings time (DST) is in effect and a Coordinated Universal Time (UTC) offset, and wherein the processing circuitry is further configured to control the wireless communication device to determine the plurality of candidate time zones at least in part by controlling the wireless communication device to determine a plurality of time zones having a DST status and UTC offset matching the indication of whether DST is in effect and the UTC offset included in the time zone information message.

14. The wireless communication device of claim 11, wherein the processing circuitry is further configured to control the wireless communication device to determine the plurality of candidate time zones at least in part by controlling the wireless communication device to determine a plurality of Internet Assigned Numbers Authority (IANA) time zones matching the set of time zone identification parameters.

15. The wireless communication device of claim 11, wherein the time zone information message is a Network Identity and Time Zone (NITZ) message.

16. The wireless communication device of claim 11, wherein the wireless network is a code division multiple access (CDMA) network, and wherein the time zone information message is a sync channel message from the CDMA network.

17. A computer program product for using a location to refine network-provided time zone information, the computer program product comprising at least one non-transitory computer readable storage medium having computer program code stored thereon, the computer program code comprising program code configured to cause a wireless communication device to:
   receive a time zone information message from a network;
   determine a plurality of candidate time zones matching a set of time zone identification parameters included in the received time zone information message;
   derive a location of the wireless communication device; and
   use the location to select a current time zone for the wireless communication device from the candidate time zones.

18. The computer program product of claim 17, wherein the computer program code further comprises program code configured to cause the wireless communication device to use the location to select the current time zone at least in part by causing the wireless communication device to:
   determine a time zone associated with the location; and
   select a candidate time zone corresponding to the time zone associated with the location as the current time zone for the wireless communication device.

19. The computer program product of claim 17, wherein the set of time zone identification parameters comprises an indication of whether daylight savings time (DST) is in effect and a Coordinated Universal Time (UTC) offset, and wherein the computer program code further comprises program code configured to cause the wireless communication device to determine the plurality of candidate time zones at least in part by causing the wireless communication device to determine a plurality of time zones having a DST status and UTC offset matching the indication of whether DST is in effect and the UTC offset included in the time zone information message.

20. The computer program product of claim 17, wherein the computer program code further comprises program code configured to cause the wireless communication device to determine the plurality of candidate time zones at least in part by causing the wireless communication device to determine a plurality of Internet Assigned Numbers Authority (IANA) time zones matching the set of time zone identification parameters.

* * * * *